United States Patent [19]

Berardi

[11] Patent Number: 5,638,151
[45] Date of Patent: *Jun. 10, 1997

[54] SELF-CONTAINED ELECTROLUMINESCENT BACK-LIT CLAP BOARD/SLATE HAVING AN LCD CLOCK DISPLAY

[76] Inventor: Philip N. Berardi, 3031 Avenida de los Arboles, Thousand Oaks, Calif. 91362

[*] Notice: The term of this patent shall not extend beyond the expiration date of Pat. No. 5,457,507.

[21] Appl. No.: 619,008

[22] Filed: Mar. 21, 1996

[51] Int. Cl.$^6$ .......................... G03B 31/00; G03B 21/32
[52] U.S. Cl. .................... 352/3; 352/90; 40/544; 40/546; 362/31; 362/84; 362/253; 340/332
[58] Field of Search ............ 352/3, 90; 362/31, 362/98, 155, 253, 84; 340/332; 40/544, 546

[56] References Cited

U.S. PATENT DOCUMENTS 5,485,354   1/1996   Ciupke et al. .................. 362/31

OTHER PUBLICATIONS

P. 66 of Audio Services Corp. Catalog, (Date Unknown), Showing Denecke TS-1 Time Code Slate.
P. 56 of Jun. 1994 American Cinematografor Magazine Showing Denecke, Inc. AD.
Denecke Inc. Catalog, 1993.
1992 BKL Inc. Article on LCD Backlighting.
1989 Loctite Luminescent Systems Inc. AD RE LCD Backlighting.

Primary Examiner—A. A. Mathews
Attorney, Agent, or Firm—Jones, Day, Reavis & Pogue

[57] ABSTRACT

A back-lighted clap board or slate used with the identification of rolls, takes and scenes and like information in the making of films that is back-lit with an electroluminescent panel. In addition, a liquid crystal display is formed on the clap board in front of the electroluminescent panel so that the liquid crystal display is back-lit and made visible and thus in dark or semidark conditions will be energized and back-lit with the light from the electroluminescent panel.

6 Claims, 1 Drawing Sheet

SELF-CONTAINED ELECTROLUMINESCENT BACK-LIT CLAP BOARD/SLATE HAVING AN LCD CLOCK DISPLAY

BACKGROUND OF THE INVENTION

1. Field of the Invention

The present invention relates in general to electroluminescent panels and specifically relates to a self-contained electroluminescent back-lit clap board/slate or reusable writing board or surface that is used for the introduction of rolls, takes and scenes in the making of movies and the video films and which includes a liquid crystal clock display that is back-lit by the electroluminescent panel.

2. Description of Related Art Including Information Disclosed Under 37 CFR 1.97 and 1.98

In the making of movies and video films, where various rolls, takes, and scenes are involved, a camera assistant typically marks a slate board with a dry-erase pen to indicate the roll number, scene number, take number and other important information. The assistant, in such case, marks the clap board/slate with the appropriate information and must open the moveable arm of the clap board/slate, call attention to the operation that is about to take place, and force the moveable arm against a stationary arm to create an audio cue (soundtrack) for matching the visual cue (film/video) for editing purposes to synchronize soundtracks with scenes, takes, and the like as recorded on the clap board/slate surface. Very often the camera assistant is using such slate in a low-light or no-light situation. In the low-light or no-light situation, a slate light has been used in the past. This is a small light that requires batteries or alternating current and an operator who must try to hold the light on the clap board while it is being operated by the camera assistant. Other solutions to the problem have been the use of small flashlights by the operator. The operator attempts to keep the clap board illuminated with the flashlight or the small slate light while it is being held and operated by the camera assistant. This creates an obvious problem because the light does not evenly cover the slate and it is difficult to hold steady on the slate or clap board.

This problem was remedied in commonly assigned U.S. Pat. No. 5,457,507 which provided a self-contained electroluminescent back-lit clap board or slate or reusable writing board or surface made of transparent or semi-transparent plexiglass™, fiberglass or similar material that may be used with a dry-erase marking pen (overhead projector pen), fluorescent dry-erase marking pen or other nonpermanent writing utensils.

However, another important requirement that has been added to such clap boards is a time code area, the Society of Motion Pictures and Television Engineers (SMPTE) code for film and video production. The prior art clap boards utilize a high intensity one-inch tall LED readout. It has to be fed a continuous time code via cable or wireless signal.

Because one-inch tall LED devices are used for the readout, at least eight "C" batteries must be used. Clearly this creates a bulky package on the backside of the clap board and adds weight to the unit. Typical units weigh 3.3 pounds with the batteries.

It would be advantageous to have a clap board that has a time code area thereon that is lightweight and that requires low power and that would require very little space.

SUMMARY OF THE INVENTION

The present invention solves the problem of the time code slate incurred in the prior art by providing a clap board or slate or reusable writing board that has an LCD time display on the front side of the slate and an electroluminescent light-generating sheet placed within the clap board behind the liquid crystal display. The unit may be constructed as set forth in U.S. Pat. No. 5,457,507 which is incorporated herein by reference in its entirety. Thus, the clap board is self-contained and illuminating and includes a light-generating sheet associated with a rectangular plastic sheet and an electronic circuit that is placed within one of the arms of the clap board and is connected to the light-generating sheet for energizing the light-generating sheet to illuminate the rectangular plastic sheet and make visible in the dark the printed design in the predetermined areas with any written indicia pertinent to the filming sequence and making visible the liquid crystal display so that the time display function is also filmed. The LCD display is driven in typical form by a driver circuit that is coupled to a clock circuit. The clock circuit may have power applied to it continuously so as to maintain the proper time. However, the display may be coupled to the power source through the switch illuminating the electroluminescent panel. This of course conserves the battery because the display would not be energized at all times but only when the electroluminescent panel is energized.

As disclosed in commonly assigned U.S. Pat. No. 5,457,507, the self-contained illuminated clap board has a timing circuit coupled between the battery and the electronic circuit such that the electroluminescent panel, when illuminated, is illuminated only for a predetermined period of time to conserve power in the event the clap board first and second arms are left in the open position with respect each other. The LCD display can also be activated by this timing circuit so that it is energized only during the same time interval that the electroluminescent panel is energized.

Thus it is an object of the present invention to provide a clap board having an electroluminescent panel that illuminates not only the written and printed information on the front side of the clap board, but also backlights an LCD display and energizes the display so that the proper time will be displayed at the beginning of the filming sequence as indicated by the clap board.

It is another object of the present invention to provide a clap board with a timing display that uses minimal power.

It is still another object of the present invention to provide a back-lit clap board having a timing circuit thereon that is light in weight and economical to use.

Thus, the present invention relates to self-contained illuminated clap boards for use in filming sequences taken in both sufficient and insufficient ambient light and including first and second parallel, abutting, elongated hollow arms pivotally attached to each other at one end in a jaw-like configuration such that the first arm can be pivotally opened and closed with respect to the second arm; at least one rectangular plastic sheet attached to and extending perpendicular from the second arm while remaining parallel to the longitudinal axis of the first and second arms, the plastic sheet having a front side and back side; a printed design on the front side of said plastic sheet, including predetermined areas for adding written indicia pertaining the filming sequence; a back-lit liquid crystal display timing unit mounted on the front side of said plastic sheet for displaying a numerical time function; a light-generating sheet associated with said rectangular plastic sheet; and an electronic circuit contained by the clap board and connected to the light-generating sheet for energizing the light-generating sheet to illuminate the rectangular plastic sheet and make visible in the dark the printed design, and the predetermined areas with any written indicia pertaining to the filming sequence, and to back-light the LCD to make the numerical time function visible only when the first arm is pivotally opened with respect to the second arm.

BRIEF DESCRIPTION OF THE DRAWINGS

These and other more detailed objects of the present invention will be more fully disclosed in the following DETAILED DESCRIPTION OF THE PREFERRED EMBODIMENT in which.

DETAILED DESCRIPTION OF THE PREFERRED EMBODIMENT

Figure 1:
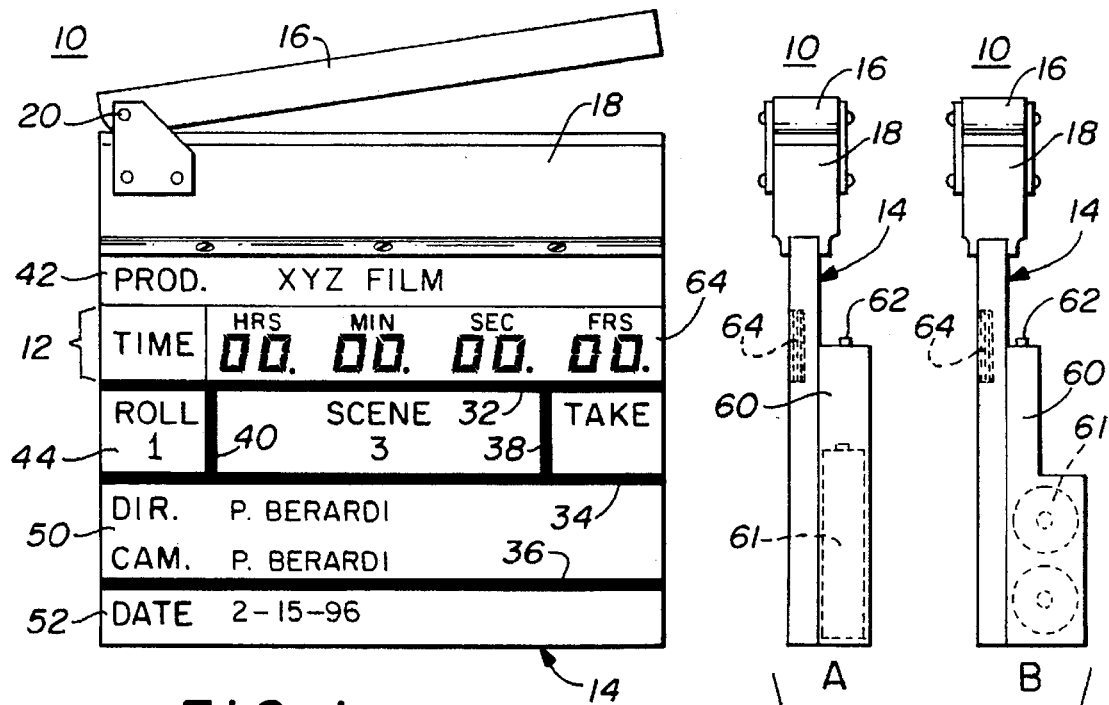
FIG. 1 is a front view of a clap board of the prior art that utilizes light-emitting diodes to provide a timing function visible on the front of the clap board.

FIG. 1 is a side view of a prior art clap board 10 comprising an upper clap board arm 16 and a lower slate portion 14. The upper elongated hollow arm 16 is preferably rectangular in cross section and is pivotally attached at pivot point 20 to a lower stationary arm 18 that is also substantially rectangular in cross-section. The slate board 14 may be comprised of a material such as plastic on which a marks can be made with a dry-erase pen to indicate the roll number, scene number, take number and other information pertinent to filming. Thus, as can be seen, the panel 14 is separated by horizontal lines 32, 34, and 36 printed thereon with horizontal lines 32 and 34 also being separated by vertical lines 38 and 40 thereby forming a number of separated areas on the panel 14. In area 42 there is printed indicia representing the name of the production which in this case is illustrated as "XYZ Film." In areas 44, 46, and 48 there is printed the words "Roll", "Scene", and "Take", respectively, and the written indicia in those respective areas are indicated by the numerals 1, 3, and 2, respectively. In area 50 there is written indicia indicating the name of the director and the cameraman which, as illustrated in FIG. 1 is P. Berardi. Finally, in area 52 there is written indicia indicating the date. There is also an area 12 between the area 42 and horizontal separation line 32. In this area a light-emitting diode (LED) display is located for expressing the time in hours, minutes, seconds, and frames (FRS) as required. The light-emitting display is designated by the numeral 64. Thus the slate 10 is sometimes designated as a time code slate.

Figure 2:
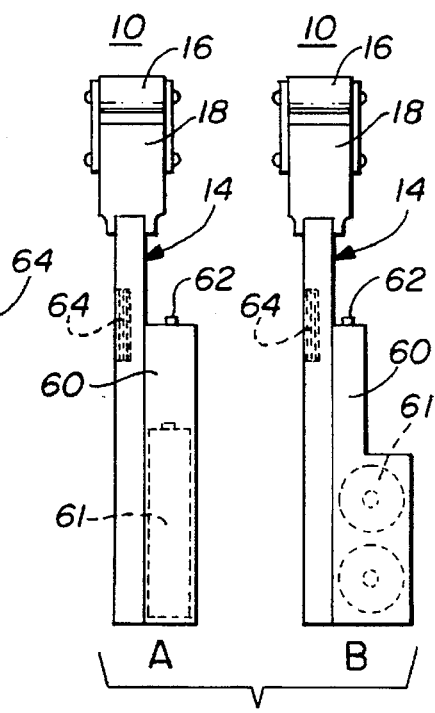
FIGS. 2A and 2B are end views of alternate types of the clap board of the prior art illustrating the control circuitry, and power supply batteries on the backside thereof for powering the light-emitting diode display.

FIGS. 2A and 2B are end views of different embodiments of the prior art time code slate 10 shown in FIG. 1. Note that the light-emitting diode display 64 is on the front of the panel 14, while a power supply and control circuit housing 60 is formed on the backside. It contains batteries or other power source 61 and a switch 62 that can be turned off as necessary to save on the power supply and turn the light-emitting display off. The weight of the device with the batteries is 3.3 pounds.

Figure 3:
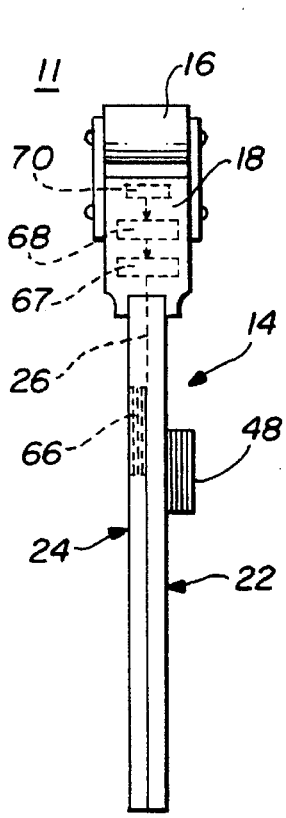
FIG. 3 is an end view of the novel clap board of the present invention that utilizes a liquid crystal display on the front panel thereof which is back-lit by an electroluminescent panel.

FIG. 3 is an end view of the novel time code slate board 11 of the present invention. It has the upper arm 16 and the lower hollow arm 18 to which is attached the lower back-lighted slate 14 as has been explained previously in U.S. Pat. No. 5,457,507, commonly owned with the present invention. When the light becomes insufficient or darkness approaches, the present invention illuminates the electroluminescent panel 26 so that the indicia on the from portion 24 of the back-lighted slate 14 can be easily seen and photographed. It functions with a circuit as has previously been explained in U.S. Pat. No. 5,457,507. Also formed in the front plastic panel 24 is a liquid crystal display 66. It is electrically connected to a drive circuit 67 in the lower rectangular hollow arm 18. A clock circuit 68 is coupled to the drive circuit 67 in a well-known fashion. A power source 70 provides the necessary power for the drive circuit 67 and the clock circuit 68. It is well known in the art that liquid crystal displays require very little power and thus the battery 70 can be very small and will serve as the power source for a long period of time. Thus, there is no change in size of the time code slate 11 with the addition of the liquid crystal display 66. Because the electroluminescent panel 26 is behind the liquid crystal display 66, between plastic panels 22 and 24, the liquid crystal display is back-lit and thus whenever the electroluminescent panel 26 is energized and the liquid crystal display 66 has power applied thereto, the time function is visible on the front of the slate board and can be photographed. A receiver 48 may be attached to the unit for receiving time signals generated remotely.

Figure 4:
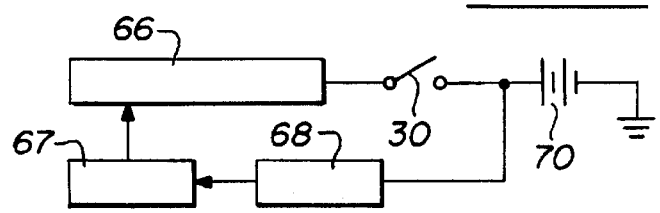
FIG. 4 is a circuit diagram of the clock circuitry of the present invention.

FIG. 4 illustrates in block diagram form the clock circuit for the liquid crystal display 66. The display 66 is coupled to the driver circuit 67 which is controlled by clock circuit 68 in a well known fashion and need not be described in detail here. Liquid crystal display clock circuits or timing units are old and well known in the art. The battery 70 can be connected directly to the clock circuit 68 to maintain a correct clock time at all times. However, the liquid crystal display 66 can be powered through switch 30 so that it will not be turned on and consume power until needed. Of course, it can be coupled to the automatic switches disclosed in U.S. Pat. No. 5,457,507 so that it is automatically powered only when the electroluminescent display panel 26 is energized. Clearly, time signals may be remotely transmitted to a receiver on the clap board itself instead of being generated on the unit.

Figure 5:
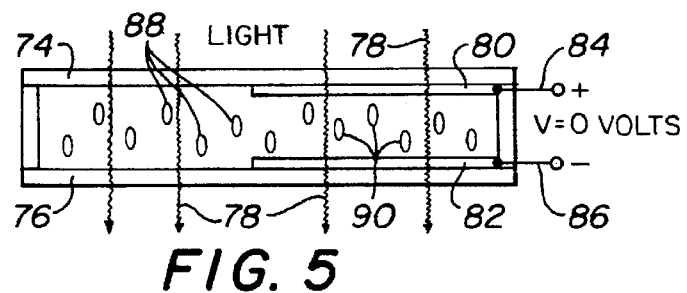
FIG. 5 is an illustration of the operating principal of a liquid crystal display with no voltage applied to the electrodes.
Figure 6:
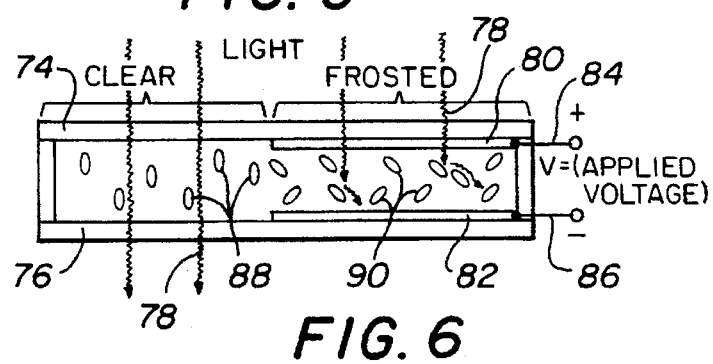
FIG. 6 is a schematic depiction of a liquid crystal display device in which voltage has been applied to the conductive plates to randomly distribute crystals in the liquid crystal material and therefore block light and cause a desired depiction to occur.

FIG. 5 is a schematic representation of a liquid crystal display showing LCD 72 formed with clear plates 74 and 76 that form a sealed chamber in which liquid crystals 88 and 90 are trapped. In a portion of the interior of the plates 74 and 76, clear conductive electrodes 80 and 82 are connected to power lines 84 and 86. As indicated in FIG. 5, when no power is applied to conductive lines 84 and 86 the liquid crystals are aligned so that most of the light passes through the display and no indicia appears. However, as can be seen in FIG. 6, when a voltage is applied to lines 84 and 86, the crystals 90 under the clear conductive plates 80 and 82 are randomly distributed and thus block any light 78 attempting to pass through thus creating a frosty area under the electrodes and thus forming visible indicia. In the other areas of the liquid crystal where there are no clear conductive plates 84 and 86, the liquid crystals remain aligned so that most of the light passes through the display.

Thus the major advantage of the time code slate of the present invention is that it has a time code liquid crystal display thereon that consumes very little power and requires very low voltages to operate. Thus the display can be driven directly from almost any low voltage logic circuit, multi-function integrated circuit or microprocessor. Of course, ambient light must be present so that the contrast can be recognized and, in this case, when low or no ambient light is available, the light is provided by the electroluminescent panel between the two plastic panels so as to back-light the LCD and cause the time function to be visible.

Thus the present invention provides a novel and unique advance in the prior art of motion picture clap board slates by adding a time code unit formed of liquid crystal that requires very little space, very little power, and weighs very little.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A self-contained illuminated clap board that has a time display function and is used in filming sequences taken with both sufficient and insufficient ambient light and comprising:

first and second parallel abutting elongated hollow arms pivotally attached to each other at one end in a jaw-like configuration such that said first arm can be pivotally opened and closed with respect to the second arm;

at least one rectangular plastic sheet attached to and extending perpendicularly from said second arm while remaining parallel to the longitudinal axis of said first and second arms, said plastic sheet having a front side and a back side;

a printed design on the front side of the plastic sheet including predetermined areas for adding written indicia pertaining to the filming sequence;

a back-lit liquid crystal display timing unit mounted on the front side of said plastic sheet for displaying a numerical time function;

a light-generating sheet associated with said plastic sheet; and an electronic circuit within one of said hollow arms and connected to said light-generating sheet for energizing said light-generating sheet to illuminate said rectangular plastic sheet and make visible in insufficient ambient light said printed design, said predetermined areas with any written indicia pertinent to the filming sequence, and said LCD to make said numerical time function visible.

2. An illuminated clap board as in claim 1 wherein said light-generating sheet is an electroluminescent panel.

3. An illuminated clap board as in claim 1 wherein said light-generating sheet is laminated with and a part of said plastic sheet.

4. A self-contained illuminated clap board as in claim 1 wherein said light-generating sheet is mounted behind said LCD time unit to back-light said time unit and make said numerical time function numerals visible.

5. A self-contained illuminated clap board as in claim 1 wherein said LCD time unit comprises:

a clock;

an LCD clock display;

a driver circuit coupled between said clock and said liquid crystal display to cause the clock time to be displayed; and a battery directly connected to said clock to maintain said clock function at all times and coupled to said liquid crystal display through a switch so as to energize said liquid crystal display only when said switch is actuated.

6. A self-contained illuminated clap board as in claim 1 further including:

a battery;

a clock directly coupled to said battery for maintaining a constant time; and connection means for coupling said battery to said liquid crystal display only when said light-generating sheet is energized.

* * * * *